United States Patent
Terada (10) Patent No.: US 10,254,149 B2
(45) Date of Patent: Apr. 9, 2019

(54) VARIABLE-RESISTOR PLATE FOR LIQUID LEVEL DETECTOR, VARIABLE-RESISTOR PLATE PRODUCTION METHOD, AND LIQUID LEVEL DETECTOR

(71) Applicant: DENSO CORPORATION, Kariya, Aichi-pref. (JP)

(72) Inventor: Yoshifumi Terada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 264 days.

(21) Appl. No.: 15/121,390

(22) PCT Filed: Feb. 24, 2015

(86) PCT No.: PCT/JP2015/000911
§ 371 (c)(1),
(2) Date: Aug. 25, 2016

(87) PCT Pub. No.: WO2015/133088
PCT Pub. Date: Sep. 11, 2015

(65) Prior Publication Data
US 2016/0363474 A1 Dec. 15, 2016

(30) Foreign Application Priority Data

Mar. 7, 2014 (JP) .................................. 2014-045412

(51) Int. Cl.
*G01F 23/36* (2006.01)
*H01C 17/242* (2006.01)
(Continued)

(52) U.S. Cl.
CPC ........... *G01F 23/363* (2013.01); *H01C 10/32* (2013.01); *H01C 10/34* (2013.01); *H01C 17/242* (2013.01)

(58) Field of Classification Search
CPC ...................................................... G01F 23/363
(Continued)

(56) References Cited

U.S. PATENT DOCUMENTS 5,051,719 A * 9/1991 Gaston .................. G01F 23/363
29/610.1
7,038,473 B2 * 5/2006 Sinz ........................ G01F 23/36
324/716
(Continued)

FOREIGN PATENT DOCUMENTS

JP 2003254815 A 9/2003
JP 2006329980 A 12/2006
(Continued)

*Primary Examiner* — Daniel S Larkin
(74) *Attorney, Agent, or Firm* — Harness, Dickey & Pierce, P.L.C.

(57) ABSTRACT

A variable-resistor plate for a liquid level detector includes: a substrate main body that is formed from a material having insulation properties; sliding electrodes that are spaced from each other and are arranged side by side along a slide locus of a slide member, which is displaced relative to the plate in accordance with a liquid surface level, on the substrate main body; a resistor that mutually connects the sliding electrodes to generate electric resistances between the sliding electrodes and that enables the correction of the variations in resistance value among individuals through adjustment of a shape of the resistor on the substrate main body; an adjustment contact part that is formed at at least one sliding electrode and is located to be deviated from the slide locus of the slide member, a measuring part of a measuring device being brought into contact with the adjustment contact part; and a pair of correction contact parts that are formed at a correction electrode, which is provided on the substrate main body, the measuring part being brought into contact with each correction contact part.

8 Claims, 5 Drawing Sheets

(51) Int. Cl.
*H01C 10/32* (2006.01)
*H01C 10/34* (2006.01)

(58) Field of Classification Search
USPC .......................................................... 73/1.73
See application file for complete search history.

(56) References Cited

U.S. PATENT DOCUMENTS

| | | | |
|---|---|---|---|
| 7,541,911 B2* | 6/2009 | Kawaguchi | G01F 23/36 338/162 |
| 2006/0019536 A1 | 1/2006 | Nagakura et al. | |
| 2006/0266112 A1 | 11/2006 | Crary et al. | |
| 2009/0266157 A1* | 10/2009 | Maruo | G01F 23/363 73/317 |

FOREIGN PATENT DOCUMENTS

| | | | |
|---|---|---|---|
| JP | 2008288354 A | 11/2008 | |
| JP | 4405334 B2 | 1/2010 | |
| JP | 2015152441 A | 8/2015 | |

* cited by examiner

VARIABLE-RESISTOR PLATE FOR LIQUID LEVEL DETECTOR, VARIABLE-RESISTOR PLATE PRODUCTION METHOD, AND LIQUID LEVEL DETECTOR

CROSS REFERENCE TO RELATED APPLICATIONS

This application is a U.S. National Phase Application under 35 U.S.C. 371 of International Application No. PCT/JP2015/000911 filed on Feb. 24, 2015 and published in Japanese as WO 2015/133088 A1 on Sep. 11, 2015. This application is based on and claims the benefit of priority from Japanese Patent Application No. 2014-045412 filed on Mar. 7, 2014. The entire disclosures of all of the above applications are incorporated herein by reference.

TECHNICAL FIELD

The present disclosure relates to a variable-resistor plate used for a liquid level detector that detects a level of a surface of liquid, a production method of the variable-resistor plate, and the liquid level detector.

BACKGROUND ART

As disclosed in, for example, Patent Document 1, a variable-resistor used for a liquid level detector conventionally indicates an electric resistance value (hereinafter "resistance value") in accordance with the level of a liquid surface by the displacement of a sliding contact relative to an insulating substrate according to the liquid surface level. In such a variable resistor, electric conductors arranged side by side along the slide locus of the sliding contact, and a resistor that connects the conductors to generate an electric resistance between these conductors are formed on the insulating substrate.

PRIOR ART DOCUMENT

Patent Document

Patent Document 1: JP2008-288354A

The configuration disclosed in Patent Document 1 can adjust the shape of the resistor on the insulating substrate to change the resistance value between the conductors. Thus, the resistance value is actually measured by bringing the measurement part of a measuring device into contact with a contact part that is formed at a particular conductor. Adjusting the resistor shape based on the actually-measured resistance value can correct the variation in resistance value for each variable resistor.

However, because of the configuration in which the conductors are arranged side by side along the slide locus of the sliding contact, forming the contact part having a shape that can be in stable contact with the measurement part at a contact position of the conductor that is in actual contact with the sliding contact is substantially impossible. Thus, the contact part used for the measurement of the resistance value is formed at a position deviated from the slide locus of the sliding contact.

An electric resistance due to the formation material of the conductor is generated between the contact part that is located to be deviated from the slide locus and the contact position that is in actual contact with the sliding contact. The resistance value (hereinafter "surplus resistance value") of such an electric resistance is influenced by physical properties of the formation material of the conductor, and thus easily varies inevitably for each variable resistor. It is difficult to accurately estimate this resistance value.

Consequently, a resistance value including the above surplus resistance value is measured by the actual measurement of the resistance value with the measurement part in contact with the contact part that is located off the contact position. Therefore, even though the resistor shape is adjusted with the resistance value actually measured, the resistance value in a state where a liquid level detector is assembled and the sliding contact is in actual contact with the conductor is shifted from a desired resistance value that is specified in designing.

SUMMARY OF INVENTION

The present disclosure addresses the above-described issues. Thus, it is an objective of the present disclosure to provide a technique that can reduce variations in resistance value in a state where a liquid level detector is assembled.

To achieve the objective, a variable-resistor plate in a first aspect of the present disclosure is adapted to be used for a liquid level detector that detects a level of a surface of liquid. The variable-resistor plate is combined with a slide member that is displaced relative to the variable-resistor plate in accordance with the level of the surface of liquid to indicate a resistance value corresponding to the level of the surface of liquid. Variations in resistance value among individuals are corrected based on resistance values that are actually measured individually using a measuring device. The variable-resistor plate includes: a substrate main body that is formed from a material having insulation properties; a plurality of sliding electrodes that are spaced from each other and are arranged side by side along a slide locus of the slide member on the substrate main body; a resistor that mutually connects the plurality of sliding electrodes to generate electric resistances between the plurality of sliding electrodes and that enables the correction of the variations in resistance value among individuals through adjustment of a shape of the resistor on the substrate main body; an adjustment contact part that is formed at at least one of the plurality of sliding electrodes and is located to be deviated from the slide locus of the slide member, a measuring part of the measuring device being brought into contact with the adjustment contact part; and a pair of correction contact parts that are formed at a correction electrode, which is provided on the substrate main body, the measuring part being brought into contact with each of the pair of correction contact parts.

A second aspect of the present disclosure is a method of producing the variable-resistor plate in the first aspect. According to the method, a measuring process is performed in which a correction resistance value of the correction electrode is measured in a state where the measuring part is in contact with each of the pair of correction contact parts. Furthermore, a setting process is performed in which: a surplus resistance value that is generated between a contact position of each of the plurality of sliding electrodes, at which the each of the plurality of sliding electrodes is in contact with the slide member, and the adjustment contact part is estimated using the correction resistance value measured in the measuring process; and a target resistance value including the surplus resistance value is set. Additionally, an adjusting process is performed in which the shape of the resistor on the substrate main body is adjusted such that a resistance value of the each of the plurality of sliding electrodes that is actually measured by the measuring device reaches the target resistance value in a state where the measuring part is in contact with the adjustment contact part.

In these aspects, the correction resistance value that is measured between the pair of correction contact parts formed at the correction electrode is a value that is inherent in the electrode formed on the variable-resistor plate. Thus, using the correction resistance value measured at the correction electrode can accurately estimate the surplus resistance value generated between the contact position of the particular sliding electrode including the adjustment contact part with which the slide member is actually in contact, and the adjustment contact part. Thus, even though the resistance value needs to be actually measured with the measuring part in contact with the adjustment contact part that is located to be shifted from the contact position, the shape of the resistor on the substrate main body can be adjusted highly accurately such that the resistance value in a state where the slide member is in contact with the sliding electrode indicates a desired resistance value. Consequently, variations in resistance value in a state where the liquid level detector is assembled can be reduced.

A third aspect of the present disclosure is a method of producing a variable-resistor plate that is used for a liquid level detector, which detects a level of a surface of liquid, and that is combined with a slide member, which is displaced relative to the variable-resistor plate in accordance with the level of the surface of liquid, to indicate a resistance value corresponding to the level of the surface of liquid. The variable-resistor plate includes: a substrate main body that is formed from a material having insulation properties; a plurality of sliding electrodes that are spaced from each other and are arranged side by side along a slide locus of the slide member on the substrate main body; and a resistor that mutually connects the plurality of sliding electrodes to generate electric resistances between the plurality of sliding electrodes. According to the method, a measuring process is performed in which: a mother substrate, out of which the plurality of substrate main bodies are cut, is prepared; a correction electrode is provided on the mother substrate outside a region of the mother substrate that is configured as the plurality of substrate main bodies; and in a state where a measuring part of a measuring device is in contact with each of a pair of correction contact parts formed at the correction electrode, a correction resistance value of the correction electrode is measured using the measuring device. Moreover, a setting process is performed in which: a surplus resistance value that is generated between a contact position of each of the plurality of sliding electrodes, at which the each of the plurality of sliding electrodes is in contact with the slide member, and an adjustment contact part that is located to be deviated from the slide locus is estimated using the correction resistance value measured in the measuring process; and a target resistance value including the surplus resistance value is set. Additionally, an adjusting process is performed in which a shape of the resistor on each of the plurality of substrate main bodies is adjusted such that a resistance value of the each of the plurality of sliding electrodes that is actually measured by the measuring device reaches the target resistance value in a state where the measuring part is in contact with the adjustment contact part, to correct variations in resistance value among individuals for the variable-resistor plate.

In this aspect, the correction electrode is not provided on the substrate main body but on the mother substrate, out of which the substrate main bodies are cut, outside the region that is used for the substrate main bodies. In such a mode as well, the correction resistance value can be a value that is inherent in the electrode formed on the variable-resistor plate. Therefore, the shape of the resistor can be adjusted precisely such that the resistance value in a state where the slide member is in contact with the sliding electrode indicates a desired resistance value.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be described below with reference to the accompanying drawings. Using the same reference numeral for corresponding components throughout the embodiments, a repeated description may be omitted. In a case of description of only a part of configuration in each embodiment, a configuration in another embodiment explained ahead of the embodiment can be applied to the other part of the configuration. In addition to a combination of the configurations indicated in the descriptions of the embodiments, the configurations in the embodiments can be partially combined together even without explanation thereof as long as this combination functions.

First Embodiment

Figure 1:
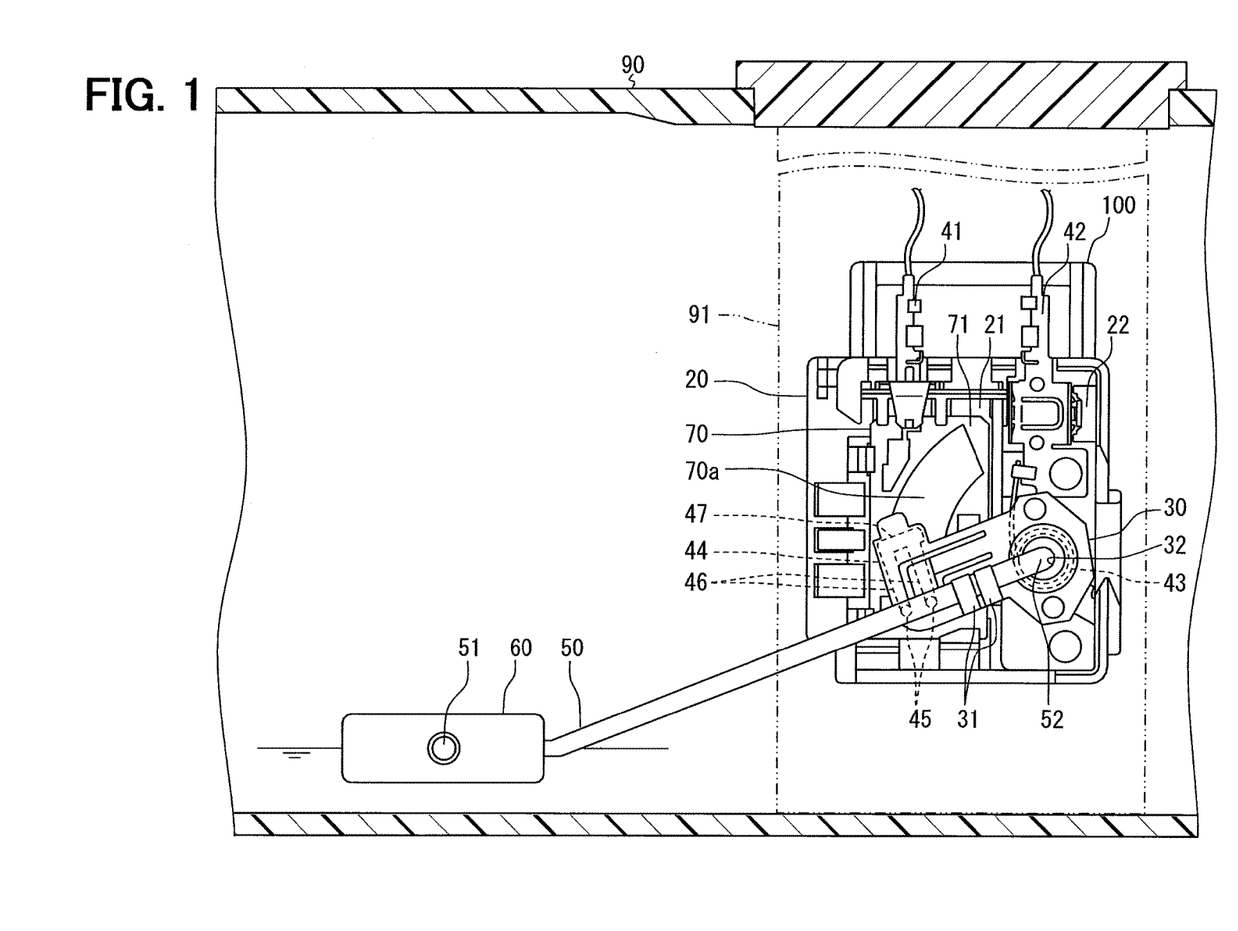
FIG. 1 is a front view illustrating a liquid level detector in accordance with a first embodiment.

As illustrated in FIG. 1, a liquid level detector 100 of a first embodiment is disposed in a fuel tank 90 that stores fuel for liquid. The liquid level detector 100 detects a level of a liquid surface of fuel stored in the fuel tank 90 in a state where the detector 100 is held by, for example, a fuel pump module 91. The detection result obtained by the liquid level detector 100 is outputted to a combination meter (not shown), and is notified to an operator by the combination meter.

The liquid level detector 100 includes a float 60, a float arm 50, an arm holder 30, a housing 20, and a variable-resistor plate 70.

The float 60 is formed from a material having a smaller specific gravity than fuel, such as foamed ebonite. The float 60 can float on the liquid surface of fuel by the buoyant force applied by fuel. The float 60 is held by the float arm 50.

The float arm 50 is formed from a round bar-shaped core material made of a conductive metallic material such as stainless steel. A float holding part 52 and a rotation shaft part 51 are formed at the float arm 50. The float holding part 52 is formed at one end side of the float arm 50 to hold the float 60. The rotation shaft part 51 is formed at the other end side of the float arm 50 to be supported rotatably by the housing 20. The float arm 50 having the configuration described above converts the upward or downward movement of the float 60 into the rotational movement of the arm holder 30.

The arm holder 30 is formed from a resin material such as polyacetal (POM) resin. An arm engagement pawl 31 and an arm insertion hole 32 are formed at the arm holder 30, and a sliding plate 44 is attached to the holder 30. When the rotation shaft part 51 is inserted into the arm insertion hole 32 and the float arm 50 is engaged with the arm engagement pawl 31, the arm holder 30 can rotate integrally with the float arm 50.

The sliding plate 44 is a plate-shaped member that is formed from a conductive metallic material. The sliding plate 44 is formed in a U-shaped manner as a whole. The sliding plate 44 includes an attachment part 47, flexible arm parts 46, and sliding contacts 45. The attachment part 47 is attached on the rear surface of the arm holder 30. The sliding plate 44 accordingly rotates integrally with the arm holder 30. The flexible arm parts 46 are spaced from each other and extend from the attachment part 47 along the rear surface of the arm holder 30. Each flexible arm part 46 can bend in the thickness direction of the sliding plate 44. Each sliding contact 45 is provided at the end portion of each flexible arm part 46 in its extending direction. The sliding contacts 45 are arranged side by side along the radial direction of the rotation shaft part 51. Each sliding contact 45 is pressed toward the variable-resistor plate 70 by the resiliency of the sliding plate 44.

The housing 20 is formed from a resin material such as POM resin. The housing 20 is attached to the fuel pump module 91, and is fixed to the fuel tank 90 via this fuel pump module 91. A substrate accommodating part 21 and a terminal accommodating part 22 are formed at the housing 20. The variable-resistor plate 70 that is connected to a substrate-side terminal 41 is accommodated in the substrate accommodating part 21. A holder-side terminal 42 is accommodated in the terminal accommodating part 22.

The substrate-side terminal 41 and the holder-side terminal 42 are formed from electrically conductive material such as phosphor bronze. The holder-side terminal 42 is held by the terminal accommodating part 22. A coil spring 43 is connected to the holder-side terminal 42. The coil spring 43 is formed by spirally winding a metal wire material. The coil spring 43 is electrically connected to the sliding plate 44.

The variable-resistor plate 70 is formed into a plate-shape, and is held by the substrate accommodating part 21. The variable-resistor plate 70 is an electronic component including a resistance circuit 70a on one surface of a substrate main body 71. The substrate main body 71 is formed into a rectangular plate-shape from a material having insulation properties such as ceramics. The resistance circuit 70a is formed in a shape of a circular arc with the rotation axis of the arm holder 30 as its center. The two sliding contacts 45 that are formed at the sliding plate 44 are pressed on the resistance circuit 70a. By combination with the sliding plate 44 that is displaced integrally with the arm holder 30, the resistance circuit 70a forms a variable resistor that increases or decreases an electric resistance value (hereinafter referred to simply as a "resistance value") between the terminals 41, 42.

In the liquid level detector 100 described above, when the arm holder 30 rotates according to the change of the liquid surface level, the sliding plate 44 that is fixed to this arm holder 30 is displaced relative to the variable-resistor plate 70 with a state of contact between each sliding contact 45 and the resistance circuit 70a maintained. Consequently, each sliding contact 45 slides on the resistance circuit 70a. When the liquid surface is sufficiently high and each sliding contact 45 is the closest to the substrate-side terminal 41, the resistance value between the terminals 41, 42 is minimized. In contrast, when each sliding contact 45 is distanced from the substrate-side terminal 41 by the rotation of the arm holder 30 due to the lowering of the liquid surface, the resistance value between the terminals 41, 42 increases gradually. By the above-described principle, the resistance value between the terminals 41, 42 corresponding to the liquid surface level is outputted as a detection result from the liquid level detector 100 to the combination meter, for example.

Figure 2:
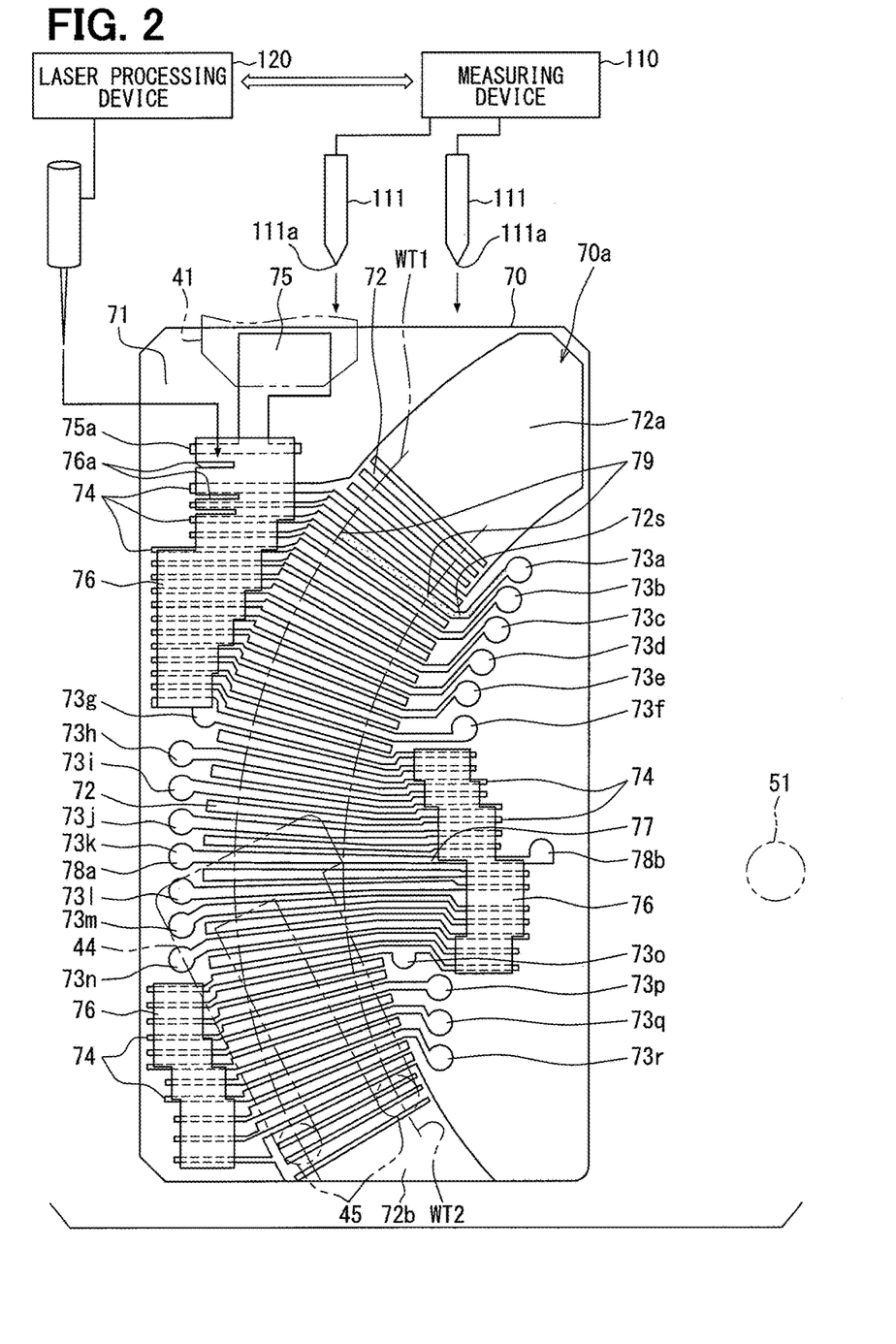
FIG. 2 is a plan view illustrating configuration of a variable-resistor plate according to the first embodiment.

The configuration of the variable-resistor plate 70 will be explained in more detail based on FIG. 2 with reference to FIG. 1. As the configurations constituting the resistance circuit 70a, the variable-resistor plate 70 includes a connection electrode 75, sliding electrodes 72, resistors 76, and a correction electrode 77.

The connection electrode 75 and the sliding electrodes 72 are formed from metallic material such as silver in a thin-film shape on the substrate main body 71. The connection electrode 75 is disposed at the edge portion of the substrate main body 71 to be connected to the substrate-side terminal 41. An extended-out part 75a is formed at the connection electrode 75. The extended-out part 75a extends out in a T-shaped manner from the main body portion of the connection electrode 75 that is formed in a rectangular shape. The extended-out part 75a extends along an extended-out part 74 (described later) with a clearance formed between the extended-out part 75a and this extended-out part 74 of the sliding electrode 72. Most of the extended-out part 75a is covered with the resistor 76.

The sliding electrodes 72 are spaced from each other, and arranged side by side on the substrate main body 71 along slide loci WT1, WT2 of the sliding plate 44. Each sliding electrode 72 has a shape extending in a strip shape along the radial direction of the rotation shaft part 51, and thus can be in contact with the sliding contacts 45 that are arranged side by side in this radial direction at (two) positions at the same time. The width of a main body portion of each sliding electrode 72 extending in a strip shape is set to be nearly equal to the width of a clearance formed between these main body portions.

The circular arc on the outer circumferential side that is drawn by one of the two sliding contacts 45 that is far from the rotation shaft part 51 as a result of the rotation of the arm holder 30 is referred to as the slide locus WT1. The circular arc on the inner circumferential side that is drawn by the other one of the two sliding contacts 45 that is close to the rotation shaft part 51 as a result of the rotation of the arm holder 30 is referred to as the slide locus WT2. The slide loci WT1, WT2 correspond substantively to contact positions 79 where the sliding contacts 45 and the sliding electrodes 72 are in contact.

The extended-out part 74 is formed for each sliding electrode 72. The extended-out part 74 extends out from the main body portion of each sliding electrode 72 that crosses the slide loci WT1, WT2 in a strip shape radially inward or radially outward of these slide loci WT1, WT2. The width of each extended-out part 74 is set to be nearly equal to or slightly narrower than the width of the main body portion. Most of each extended-out part 74 is covered with the resistor 76.

Adjustment pads 73a to 73r are formed at a part of many sliding electrodes 72. In the first embodiment, the sliding electrodes 72 that have the adjustment pads 73a to 73r and the sliding electrodes 72 that do not have the adjustment pads 73a to 73r are arranged side by side generally alternately. Each of the adjustment pads 73a to 73r is one end of a corresponding one of the sliding electrodes 72, and is formed into a generally circular shape. The adjustment pads 73a to 73r are located to be deviated from the slide loci WT1, WT2 radially inward or radially outward of the slide loci WT1, WT2. A measuring terminal 111 of a measuring device 110 (described later) is brought into contact with each of the adjustment pads 73a to 73r. To stabilize its contact with the measuring terminal 111, the diameter of each of the adjustment pads 73a to 73r is set to be larger than the width of the main body portion of each sliding electrode 72.

Resistors 76 are formed from a composition that contains ruthenium oxide to have conductive properties. Resistors 76 have a higher electrical resistivity than the connection electrode 75. Resistors 76 are formed in a membranous manner at more than one position on the substrate main body 71 by, for example, painting or printing. Resistors 76 are formed astride across the extended-out parts 74, 75a to electrically connect together these extended-out parts 74, 75a. Resistors 76 produce an electric resistance between the adjacent electrodes.

Similar to the other electrodes 75, 72, the correction electrode 77 is formed from a metallic material such as silver in a thin-film shape on the substrate main body 71. A pair of correction pads 78a, 78b are formed at the correction electrode 77. Similar to the adjustment pads 73a to 73r, the correction pads 78a, 78b are formed into a generally circular shape. The measuring terminal 111 (described later) is brought into contact with the correction pads 78a, 78b.

In the first embodiment, one of the sliding electrodes 72 also serves as the above correction electrode 77. Thus, the adjustment pad 73k formed at the sliding electrode 72, which also serves as the correction electrode 77, also functions as the one correction pad 78a. The correction pads 78a (73k), 78b are formed at both end portions of the correction electrode 77 in its extending direction.

In the variable-resistor plate 70 having the above-described configuration, adjusting the shape of the resistor 76 on the substrate main body 71 can increase or decrease the sectional area of the part of the resistor 76 that forms the conduction between the extended-out parts 74, 75a. This can change the resistance value caused between the connection electrode 75 and each sliding electrode 72. Thus, actually measuring the resistance value between the connection electrode 75 and each sliding electrode 72 and adjusting the shape of the resistor 76 based on the actually-measured resistance value can correct the variations in resistance value among individuals.

The measuring device 110 and a laser processing device 120 that are used for the above resistance value correction in the process for manufacturing the variable-resistor plate 70 will be described below with reference to FIG. 2.

The measuring device 110 includes the two measuring terminals 111. An end part 111a of the measuring terminal 111 is formed in a needle-shape from an electrically conductive material. One end part 111a is pressed mainly on the connection electrode 75. The other end part 111a is pressed on the adjustment pads 73a to 73r and regions 72a, 72b at both ends of the group of sliding electrodes 72. The measuring device 110 can actually measure the resistance value for the measuring sections that are set between the connection electrode 75 and the adjustment pads 73a to 73r, and each of the regions 72a, 72b. In the explanation below, for example, the measuring section from the connection electrode 75 to the region 72a is described as a "measuring section 75-72a."

The laser processing device 120 irradiates the part of the resistor 76 that connects together the extended-out parts 74, 75a with laser light to partly remove the resistor 76. A missing part 76a is accordingly formed at the resistor 76. Based on the resistance value that is actually measured by the measuring device 110, the laser processing device 120 can appropriately change the length of the missing part 76a along the extending direction of the extended-out part 74.

The adjustment pads 73a to 73r that are used for measuring the resistance value are formed at the positions deviated from the slide loci WT1, WT2. Thus, electric resistance due to the forming material of the sliding electrode 72 is generated between the contact positions 79 of the sliding electrodes 72 with which the sliding plate 44 is in actual contact, and the adjustment pads 73a to 73r. Specifically, the electric resistance value of the part (hereinafter "surplus part": see the dotted region in FIG. 2) 72s of the sliding electrode 72 including the adjustment pad 73a from one of the two contact positions 79, which is far from the adjustment pad 73a, to this adjustment pad 73a is a surplus resistance value SR. The method of producing the variable-resistor plate 70 on which the missing part 76a is formed at the resistor 76 so that the resistance value at the contact position 79 becomes an aimed value with such a surplus resistance value SR correctly estimated will be described in detail based on FIG. 3 with reference to FIG. 2.

Figure 3:
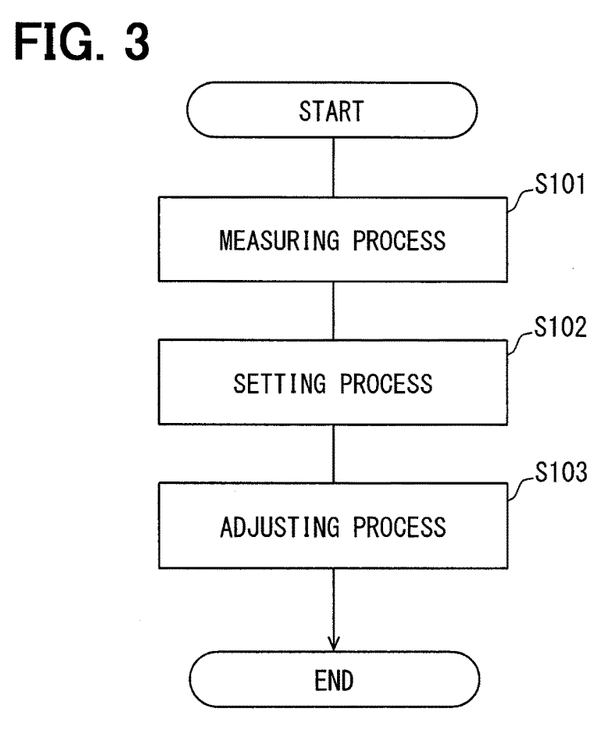
FIG. 3 is a flow chart illustrating processes in sequence for correcting a resistance value by adjustment of a shape of a resistor according to the first embodiment.

In a measuring process (S101), a correction resistance value CR of the correction electrode 77 is measured by the measuring device 110 in a state where a measuring terminal 111 is in contact with each of the pair of correction pads 78a, 78b. This correction resistance value CR is an inherent value in physical properties of the electrode that is formed on the variable-resistor plate 70.

In a setting process (S102) carried out after the measuring process, the surplus resistance value SR is estimated using the correction resistance value CR that is actually measured in the measuring process. The surplus resistance value SR is calculated by multiplying the correction resistance value CR by a predetermined correction factor CC. The correction factor CC is set individually for each of the measuring sections 75-72a, 75-73a to 75-73r, 75-72b. The correction factor CC is calculated based on the correlation between the width and length of the correction electrode 77, and the width and length of the surplus part 72s.

In the setting process, the range of a target resistance value TR is set by adding an aimed resistance value DR to the surplus resistance value SR and setting a permissible error range ER. The aimed resistance value DR is a resistance value that is specified in designing, and is a resistance value that may be indicated at the contact position 79 that is far from the adjustment pads 73a to 73r. The target resistance value TR is set for each measuring section. Specifically, the target resistance value TR is calculated by the following equation (1).

$$TR = SR + (CR \times CC) \pm ER \tag{1}$$

In an adjusting process (S103) carried out after the setting process, one measuring terminal 111 is pressed on the main body portion of the connection electrode 75. The other measuring terminal 111 is first pressed on the region 72a. In this state, the shape of the resistor 76 connecting together the extended-out part 75a and the extended-out part 74 is adjusted by the laser processing device 120. The laser processing device 120 increases the missing part 76a along the extending direction of the extended-out part 74 until the resistance value that is actually measured by the measuring device 110 falls within the range of the target resistance value TR that is set for the measuring section 75-72a.

When the resistance value that is actually measured by the measuring device 110 falls within the range of the target resistance value TR, the other measuring terminal 111 is pressed on the adjustment pad 73a. In this state, the laser processing device 120 forms the missing part 76a at the resistor 76 connecting together the two extended-out parts 74 so that the resistance value that is actually measured by the measuring device 110 falls within the range of the target resistance value TR that is set for the measuring section 75-73a. The above processing is repeated to the measuring section 75-72b to complete the adjusting process.

In the first embodiment described above, the correction resistance value CR that is measured between the pair of correction pads 78a, 78b is a value that is inherent in the electrode formed on the variable-resistor plate 70. Thus, using the correction resistance value CR that is measured at the correction electrode 77 can correctly estimate the surplus resistance value SR that is generated at the surplus part 72s at the sliding electrode 72 including the adjustment pad 73a. Consequently, even though the resistance value needs to be actually measured using the adjustment pads 73a to 73r located to be shifted from the contact positions 79, the shape of the resistor 76 can be adjusted highly accurately so that the resistance value in a state where the sliding plate 44 is in contact with the sliding electrodes 72 indicates the aimed resistance value DR. This can accordingly reduce variations in resistance value in a state where the liquid level detector 100 is assembled.

Moreover, in the first embodiment, the particular sliding electrode 72 and the particular adjustment pad 73k also serve as the correction electrode 77 and the correction pad 78a, respectively. Thus, the unique correction resistance value CR that varies in each variable-resistor plate 70 is measurable using the actual sliding electrode 72. This can accordingly further improve the accuracy of the estimated surplus resistance value SR. Therefore, the accuracy of adjustment in shape of the resistor 76 improves, and thus variations in resistance value in a state where the liquid level detector 100 is assembled can further be reduced.

Furthermore, the particular sliding electrode 72 also functioning as the correction electrode 77 as in the first embodiment eliminates the need for forming the correction electrode 77 on the substrate main body 71 separately from the sliding electrodes 72. This realizes the simplification of arrangement of the electrodes on the substrate main body 71.

Additionally, in the first embodiment, each sliding electrode 72 and the sliding plate 44 are in contact at two positions. Consequently, the part of sliding electrode 72 from one of the two contact positions 79 that is far from the adjustment pads 73a to 73r to these adjustment pads 73a to 73r is the surplus part 72s. Thus, the surplus part 72s is longer than the mode of one sliding contact, and thus the surplus resistance value SR, which is included in the resistance value that is actually measured by the measuring device 110, is also larger. Therefore, applying this technique to precisely estimate the surplus resistance value SR to highly accurately adjust the shape of the resistor 76 to the configuration in which the sliding plate 44 is in contact with the sliding electrodes 72 at more than one positions can significantly produce the effect of reducing variations in resistance value.

In the first embodiment, the sliding plate 44 may correspond to a "slide member", and each of the adjustment pads 73a to 73r may correspond to an "adjustment contact part." The correction pads 78a, 78b may correspond to "correction contact parts," and the measuring terminal 111 may correspond to a "measuring part."

Second Embodiment

Figure 4:
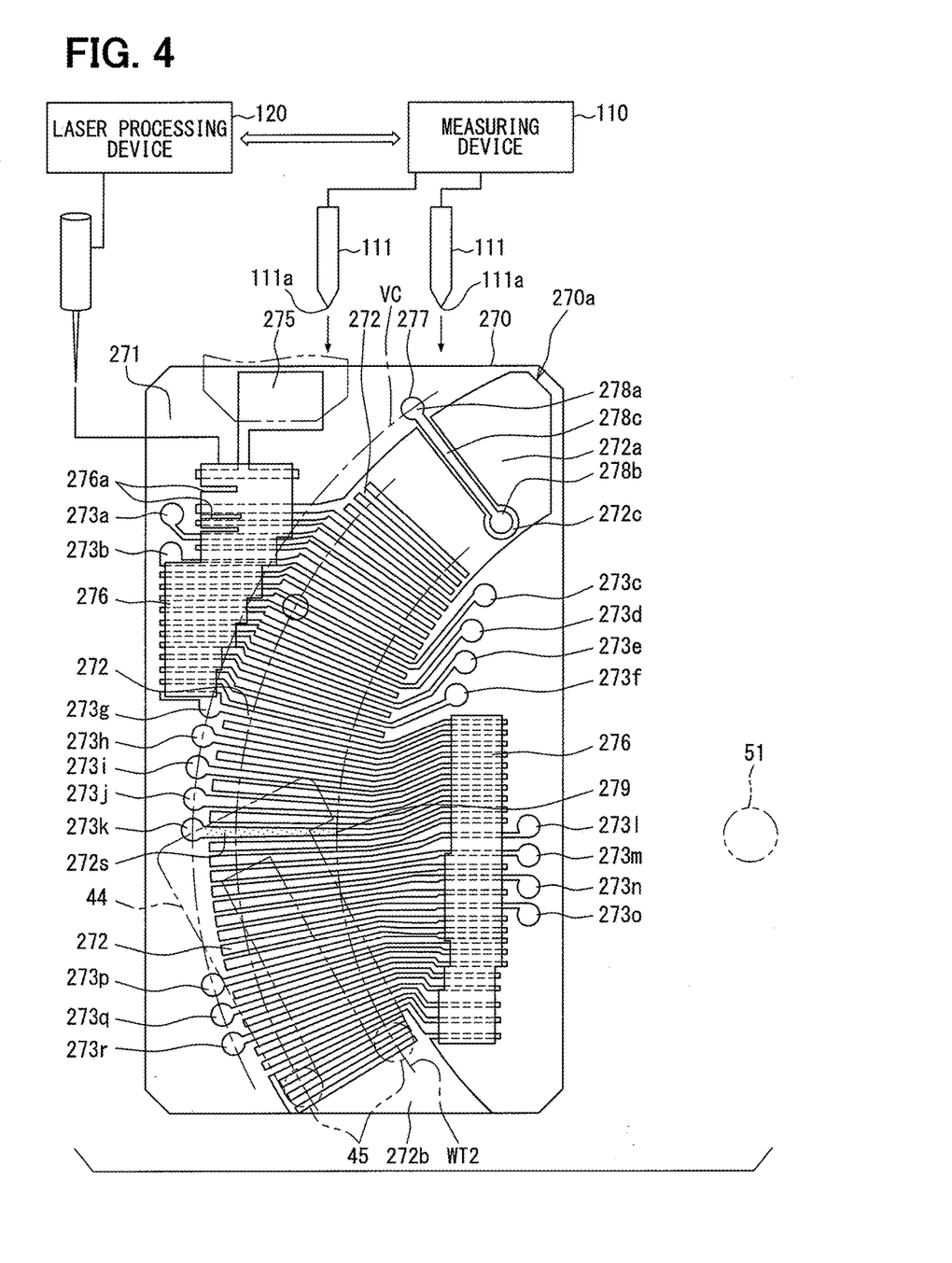
FIG. 4 is a plan view illustrating configuration of a variable-resistor plate in accordance with a second embodiment.

A second embodiment illustrated in FIG. 4 is a modification to the first embodiment. A connection electrode 275, sliding electrodes 272, and a resistor 276 corresponding to the components 75, 72, 76 of the first embodiment are provided for a resistance circuit 270a of a variable-resistor plate 270 of the second embodiment. In addition, a correction electrode 277 of the second embodiment is formed on a substrate main body 271 separately from the sliding electrodes 272.

The correction electrode 277 is formed at a removed portion 272c that is provided in a region 272a not to overlap with the sliding electrodes 272. The correction electrode 277 is provided at the position that is not in contact with sliding contacts 45 of a sliding plate 44. The correction electrode 277 extends in a strip shape along the radial direction of a rotation shaft part 51. The correction electrode 277 includes a pair of correction pads 278a, 278b and an intermediate electrode part 278c. Similar to adjustment pads 273a to 273r, the correction pads 278a, 278b are formed in a generally circular shape. One correction pad 278a is provided at the position that overlaps with an imaginary circle VC connecting the adjustment pads 273g to 273k, 273p to 273r. The other correction pad 278b is provided at the position that overlaps with a slide locus WT2.

The intermediate electrode part 278c is formed between the correction pads 278a, 278b. As a result of the arrangement of the correction pads 278a, 278b described above, the length of the intermediate electrode part 278c is substantially the same as the length of a surplus part 272s of each of the sliding electrodes 272 of the adjustment pads 273g to 273k, 273p to 273r. Additionally, the width of the intermediate electrode part 278c corresponds to the width of each surplus part 272s described above. In this manner, the width and length of the intermediate electrode part 278c correspond to the width and length of the particular surplus part 272s. Thus, a correction resistance value CR that is actually measured at the correction electrode 277 becomes a value that approximates a surplus resistance value SR of the surplus part 272s. This surplus part 272s is the part of each of the sliding electrodes 272 from a contact position 279 where the sliding electrode 272 is in contact with the sliding plate 44 to a corresponding one of the adjustment pads 273g to 273k, 273p to 273r (see the dotted region in FIG. 4).

The method for making the above-described variable-resistor plate 270 will be explained below. In the measuring process (S101: see FIG. 3), the correction resistance value CR of the correction electrode 277 is measured by a measuring device 110, with a measuring terminal 111 in contact with each of the pair of correction pads 278a, 278b. In the setting process (S102: see FIG. 3), the surplus resistance value SR is calculated using the correction resistance value CR that is actually measured in the measuring process. A correction factor CC used in this case takes a value that is close to 1.0 since the shape of the correction electrode 277 is similar to the shape of the surplus part 272s. Furthermore, in the setting process, a target resistance value TR for each measuring section is set based on the equation (1) expressed above using the estimated surplus resistance value SR.

In the adjusting process (S103: see FIG. 3), the measuring terminal 111 is pressed on the region 272a, the adjustment pads 273a to 273r, and a region 272b in turn, and a missing part 276a is formed at the resistor 276 by a laser processing device 120. Consequently, the resistance values that are actually measured at the adjustment pads 273a to 273r are adjusted to fall within the range of the target resistance value TR that is set for each measuring section.

In the second embodiment described above as well, similar to the first embodiment, actually measuring the correction resistance value CR that is inherent in the electrode formed on the variable-resistor plate 270 can accurately estimate the surplus resistance value SR using this correction resistance value CR. This can realize the highly accurate adjustment of the shape of the resistor 276 to reduce the variations in resistance value in a state where a liquid level detector 100 (see FIG. 1) is assembled.

Additionally, the configuration in which the correction electrode 277 is formed as a separate electrode from the sliding electrodes 272 as in the second embodiment can ensure the flexibility in the shape of the correction electrode 277. Thus, the shape of the correction electrode 277 can be set at a shape that is suitable for the accurate estimation of the surplus resistance value SR. Specifically, in the second embodiment, the shape of the intermediate electrode part 278c is similar to the shape of the surplus part 272s. Thus, the actually-measured correction resistance value CR become a value that is close to the surplus resistance value SR. Consequently, the error in estimating the surplus resistance value SR based on the correction resistance value CR can be reduced, and thus the adjustment of the resistor shape can be made with higher accuracy. Therefore, the variations in resistance value in a state where the liquid level detector is assembled can further be reduced.

In the second embodiment, each of the adjustment pads 273a to 273r may correspond to the "adjustment contact part," and the correction pads 278a, 278b may correspond to the "correction contact parts."

Third Embodiment

Figure 5:
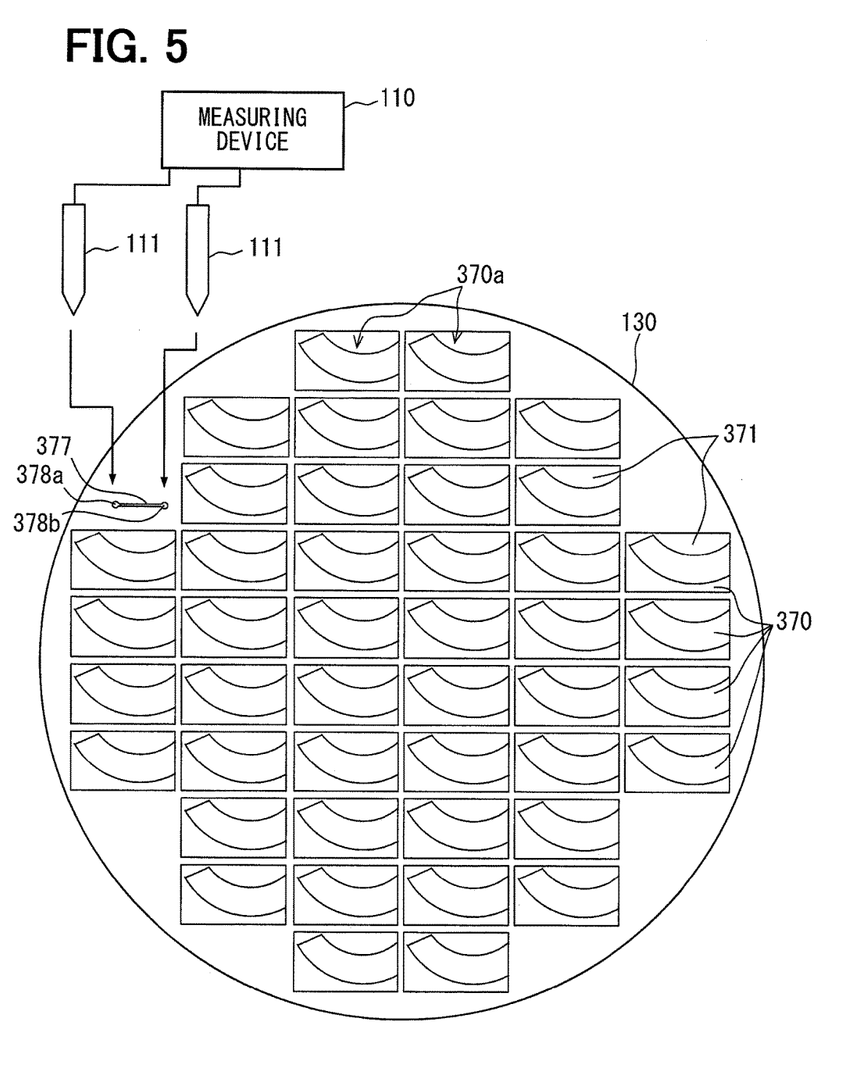
FIG. 5 is a plan view illustrating configuration of a mother substrate from which many variable-resistor plates are taken in accordance with a third embodiment.

In a third embodiment illustrated in FIG. 5, a correction electrode 377 is formed not on individual substrate main bodies 371 but on a mother substrate 130 out of which these substrate main bodies 371 are cut. The mother substrate 130 is a panel having a circular plate shape that is made of ceramics, which is a forming material of the substrate main body 371. The correction electrode 377 is provided on the surface of the mother substrate 130 outside the region that is used for the substrate main bodies 371. In the process for forming the electrodes of resistance circuits 370a in the substrate main bodies 371, the correction electrode 377 is formed together with the electrodes. The resistance circuit 370a of the third embodiment is a mode in which the removed portion 272c and the correction electrode 277 are eliminated from the resistance circuit 270a of the second embodiment illustrated in FIG. 4.

The process for correcting a resistance value on variable-resistor plates 370 that are cut out of this mother substrate 130 will be described below with reference to FIGS. 5 and 4.

In the measuring process (S101: see FIG. 3), the mother substrate 130 before the variable-resistor plates 370 are cut out is prepared first. Then, a correction resistance value CR of the correction electrode 377 is measured by a measuring device 110 in a state where measuring terminals 111 are in contact respectively with a pair of correction pads 378a, 378b of the correction electrode 377. This correction resistance value CR is a unique value usable for the corrections to all the variable-resistor plates 370 that are cut out of the mother substrate 130.

In the setting process (S102: see FIG. 3), a surplus resistance value SR is estimated using the correction resistance value CR that is actually measured in the measuring process. Furthermore, a target resistance value TR for each measuring section is set based on the equation (1) expressed above based on the estimated surplus resistance value SR.

In the adjusting process (S103: see FIG. 3), the measuring terminal 111 is pressed on a region 272a, adjustment pads 273a to 273r, and a region 272b (respectively see FIG. 3) on the resistance circuit 370a in turn, and a missing part 276a is formed at a resistor 276. Consequently, the resistance values that are actually measured at the adjustment pads 273a to 273r and the regions 272a, 272b are adjusted to fall within the range of the target resistance value TR that is set for each measuring section.

Even though the correction electrode 377 is provided on the mother substrate 130 outside the region that is used for the substrate main bodies 371 as in the third embodiment described above, the actually-measured correction resistance value CR can indicate a value that is inherent in the electrode formed on each variable-resistor plate 370 that is cut out of the mother substrate 130. Thus, the shape of the resistor 276 can be adjusted precisely so that the resistance value in a state where a sliding plate 44 is in contact with sliding electrodes 272 indicates an aimed resistance value DR.

The embodiments have been described above. The present disclosure is not interpreted by limiting to these embodiments, and can be applied to various embodiments and their combination without departing from the scope of the disclosure. Modifications to the above embodiments will be described below.

In the above embodiments, the sliding electrode for which the adjustment pad is provided, and the sliding electrode for which the adjustment pad is not provided are arranged generally alternately side by side. However, such an arrangement of the sliding electrodes can be changed appropriately. For example, the mode of forming the sliding electrode, for which the adjustment pad is provided, at intervals of two electrodes or at intervals of three electrodes may be employed. The shape of the adjustment pad is not limited to a circular shape described above, and can be changed appropriately.

In the above embodiments, the measuring terminal that is formed in a needle-shape is used as the measuring part. Due to such a needle-shape, the measuring terminal bites into each adjustment pad and each correction pad to form a reliable conduction with each electrode. However, this measuring part does not necessarily have a needle-shape, and can be changed appropriately.

In the above first embodiment, the central one of the sliding electrodes that are arranged side by side along the slide locus also serves as the correction electrode to decrease the number of pads for which the resistance value is actually measured. However, any number of more than one sliding electrodes may also serve as the correction electrodes. The sliding electrodes may be configured to also serve as the correction electrodes including a pair of correction pads. As described above, using the correction resistance values measured at more than one correction electrodes can further improve the accuracy in estimating the surplus resistance value.

In the above second embodiment, one correction electrode is formed in the region outside the movable range of the sliding contacts. However, more than one correction electrodes may be formed on the substrate main body if the space can be maintained on the substrate main body. Additionally, forming the correction electrodes having different lengths from each other and selecting for use the correction resistance value measured at the correction electrode having the most similar shape to the surplus part can further improve the accuracy in estimating the surplus resistance value.

In the above third embodiment, only one correction electrode is formed on the mother substrate outside the region in which the variable-resistor plates are formed. However, more than one correction electrodes may be formed on the mother substrate. For example, forming correction electrodes at more than one positions on the mother substrate, and selecting for use the correction resistance value measured at the correction electrode that is the closest to the position on the mother substrate at which the variable-resistor plate is cut out can secure the accuracy in estimating the surplus resistance value, without providing a correction electrode for each variable-resistor plate.

In the above embodiments, the resistance value is corrected by trimming the resistor by the irradiation of laser light. However, the method of processing for adjustment of the resistor shape is not limited to the method by the irradiation of laser light. The trimming of the resistor can also be carried out by a chemical or mechanical processing method, or by combination of these methods.

In the above embodiments, the configuration of the two sliding contacts in contact with one sliding electrode enables the output of the resistance value, for example, even in the situation where foreign substances are located between one sliding contact and the sliding electrode. However, the number of sliding contacts is not limited to two, and can be changed appropriately. For example, one, or three or more sliding contacts may be provided.

In the above embodiments, the error range ER that is used in setting the range of the target resistance value TR can be changed for each measuring section. For example, the error range ER may become narrower as the measuring section becomes closer to the connection electrode. The error range ER may become larger in a phased manner as the measuring section becomes farther from the connection electrode.

In the above embodiments, ceramics is used as an insulating material for forming the substrate main body. However, such an insulating material is not limited to ceramics, and can be changed appropriately. The electrical conducting material used as each electrode is also not limited to silver, and can be changed appropriately.

The example of application of the present disclosure to the variable-resistor plate used for the liquid level detector that detects the remaining amount of fuel has been described above. However, the object for application of the present disclosure is not limited to such a variable-resistor plate of the liquid level detector, and may be a variable-resistor plate of a liquid level detector that is disposed in a container for another liquid such as brake fluid, engine coolant, or engine oil, which is loaded onto a vehicle. In addition, the present disclosure is applicable to a variable-resistor plate of a liquid level detector which is disposed in a liquid container provided for various domestic apparatuses or various transport machines, as well as to a liquid level detector for a vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A variable-resistor plate adapted to be used for a liquid level detector that detects a level of a surface of liquid, wherein:
   the variable-resistor plate is combined with a slide member that is displaced relative to the variable-resistor plate in accordance with the level of the surface of liquid to indicate a resistance value corresponding to the level of the surface of liquid; and
   variations in resistance value of the variable-resistor plate are corrected based on resistance values that are actually measured individually using a measuring device, the variable-resistor plate comprising:
   a substrate main body that is formed from a material having insulation properties;
   a plurality of sliding electrodes that are spaced from each other and are arranged side by side along a slide locus of the slide member on the substrate main body;
   a resistor that mutually connects the plurality of sliding electrodes to generate electric resistances between the plurality of sliding electrodes and that enables the correction of the variations in resistance value of the variable-resistor plate through adjustment of a shape of the resistor on the substrate main body;
   an adjustment contact part that is formed at at least one of the plurality of sliding electrodes and is located to be deviated from the slide locus of the slide member, wherein a measuring part of the measuring device is brought into contact with the adjustment contact part; and
   a pair of correction contact parts that are formed at a correction electrode, which is provided on the substrate main body, wherein the measuring part is brought into contact with each of the pair of correction contact parts.

2. The variable-resistor plate according to claim 1, wherein:
   one of the plurality of sliding electrodes also serves as the correction electrode; and
   the adjustment contact part that is formed at the one of the plurality of sliding electrodes also serving as the correction electrode also functions as one of the pair of correction contact parts.

3. The variable-resistor plate according to claim 1, wherein the correction electrode is formed on the substrate main body separately from the plurality of sliding electrodes.

4. The variable-resistor plate according to claim 3, wherein:
   the correction electrode includes an intermediate electrode part between the pair of correction contact parts;
   a section of one of the plurality of sliding electrodes that includes the adjustment contact part from a contact position at which the one of the plurality of sliding electrodes is in contact with the slide member to the adjustment contact part is a surplus part; and
   a width and a length of the intermediate electrode part correspond to a width and a length of the surplus part.

5. The variable-resistor plate according to claim 1, wherein each of the plurality of sliding electrodes is in contact with the slide member at more than one position.

6. A method of producing the variable-resistor plate recited in claim 1, the method comprising:

performing a measuring process in which a correction resistance value of the correction electrode is measured in a state where the measuring part is in contact with each of the pair of correction contact parts;

performing a setting process in which:
- a surplus resistance value that is generated between a contact position of each of the plurality of sliding electrodes, at which the each of the plurality of sliding electrodes is in contact with the slide member, and the adjustment contact part is estimated using the correction resistance value measured in the measuring process; and
- a target resistance value including the surplus resistance value is set; and performing an adjusting process in which the shape of the resistor on the substrate main body is adjusted such that a resistance value of the each of the plurality of sliding electrodes that is actually measured by the measuring device reaches the target resistance value in a state where the measuring part is in contact with the adjustment contact part.

7. A liquid level detector comprising: a variable-resistor plate that detects a level of a surface of liquid, wherein:

the variable-resistor plate is combined with a slide member that is displaced relative to the variable-resistor plate in accordance with the level of the surface of liquid to indicate a resistance value corresponding to the level of the surface of liquid; and variations in resistance value of the variable-resistor plate are corrected based on resistance values that are actually measured individually using a measuring device, the variable-resistor plate comprising:
- a substrate main body that is formed from a material having insulation properties;
- a plurality of sliding electrodes that are spaced from each other and are arranged side by side along a slide locus of the slide member on the substrate main body;
- a resistor that mutually connects the plurality of sliding electrodes to generate electric resistances between the plurality of sliding electrodes and that enables the correction of the variations in resistance value of the variable-resistor plate through adjustment of a shape of the resistor on the substrate main body;
- an adjustment contact part that is formed at at least one of the plurality of sliding electrodes and is located to be deviated from the slide locus of the slide member, wherein a measuring part of the measuring device is brought into contact with the adjustment contact part; and
- a pair of correction contact parts that are formed at a correction electrode, which is provided on the substrate main body, wherein the measuring part is brought into contact with each of the pair of correction contact parts.

8. A method of producing a variable-resistor plate that is used for a liquid level detector, which detects a level of a surface of liquid, and that is combined with a slide member, which is displaced relative to the variable-resistor plate in accordance with the level of the surface of liquid, to indicate a resistance value corresponding to the level of the surface of liquid, wherein the variable-resistor plate includes:
- a substrate main body that is formed from a material having insulation properties;
- a plurality of sliding electrodes that are spaced from each other and are arranged side by side along a slide locus of the slide member on the substrate main body, wherein the substrate main body is one of a plurality of substrate main bodies; and
- a resistor that mutually connects the plurality of sliding electrodes to generate electric resistances between the plurality of sliding electrodes, the method comprising:

performing a measuring process in which:
- a mother substrate, out of which the plurality of substrate main bodies are cut, is prepared;
- a correction electrode is provided on the mother substrate outside a region of the mother substrate that is configured as the plurality of substrate main bodies; and
- in a state where a measuring part of a measuring device is in contact with each of a pair of correction contact parts formed at the correction electrode, a correction resistance value of the correction electrode is measured using the measuring device;

performing a setting process in which:
- a surplus resistance value that is generated between a contact position of each of the plurality of sliding electrodes, at which the each of the plurality of sliding electrodes is in contact with the slide member, and an adjustment contact part that is located to be deviated from the slide locus is estimated using the correction resistance value measured in the measuring process; and
- a target resistance value including the surplus resistance value is set; and performing an adjusting process in which a shape of the resistor on each of the plurality of substrate main bodies is adjusted such that a resistance value of the each of the plurality of sliding electrodes that is actually measured by the measuring device reaches the target resistance value in a state where the measuring part is in contact with the adjustment contact part, to correct variations in resistance value among individuals for the variable-resistor plate.

* * * * *